(No Model.) 2 Sheets—Sheet 2.

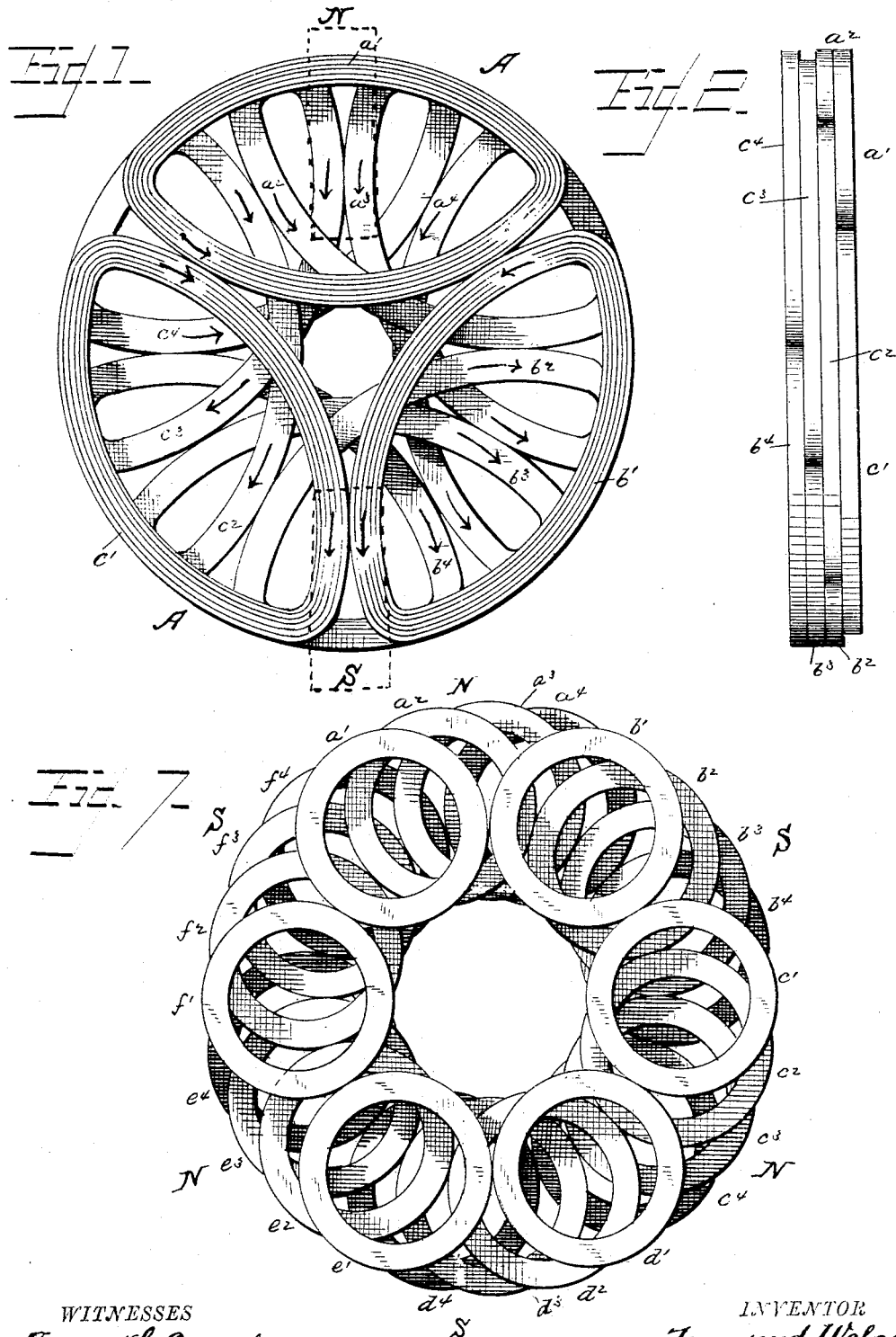

T. WOLCOTT.
ARMATURE FOR DYNAMO ELECTRIC MACHINES.

No. 286,247. Patented Oct. 9, 1883.

Witnesses.
A. Ruppert.
E. Gaddis.

Inventor:
T. Wolcott
by J. R. Nottingham
Atty.

N. PETERS, Photo-Lithographer, Washington, D. C.

UNITED STATES PATENT OFFICE.

TOWNSEND WOLCOTT, OF NEW YORK, N. Y.

ARMATURE FOR DYNAMO-ELECTRIC MACHINES.

SPECIFICATION forming part of Letters Patent No. 286,247, dated October 9, 1883.

Application filed April 24, 1883. (No model.)

*To all whom it may concern:*

Be it known that I, TOWNSEND WOLCOTT, a citizen of the United States, residing at New York, in the county of New York and State of New York, have invented certain new and useful Improvements in Armatures for Dynamo-Electric Machines, of which the following is a specification, reference being had therein to the accompanying drawings.

This invention relates to that type of dynamo-electric machines in which the armature-wheel is composed of coils arranged in a circle about a shaft and wound in the plane of rotation in such manner that portions of said coils cut the magnetic field in a plane perpendicular to its axis.

Dynamo-electric machines of this class have heretofore been constructed in which triangular and other shaped coils have been placed close together in the same plane to form a complete armature-wheel, and there has also been made an armature-wheel with bars radiating in the form of a Maltese cross, several of such crosses or layers being fixed side by side upon the same shaft, and having their bars arranged progressively, so that the bars of one layer stand opposite the spaces between the bars of adjacent layers, and the bars of all the layers being connected in a common circuit with the bars of each complete layer forming a series, having direct connection to a commutator.

It is the object of my invention to increase the uniformity of the current in machines of this class; and with this object in view my improvement consists in a novel arrangement of coreless coils in layers or ranges, and connected in closed circuits, as will be hereinafter particularly described, in connection with the accompanying drawings, and definitely pointed out in the appended claims.

Figure 3:
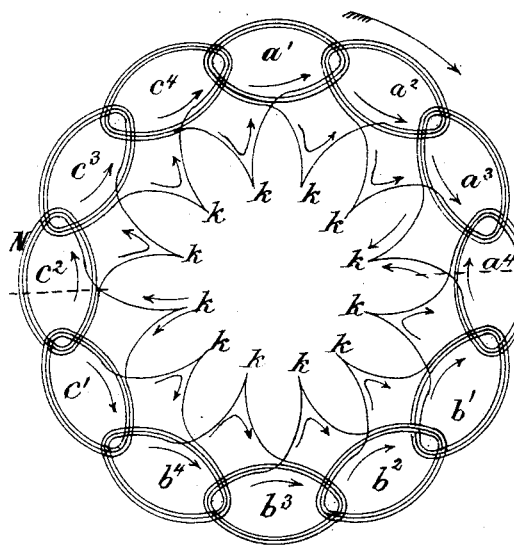
Figure 4:
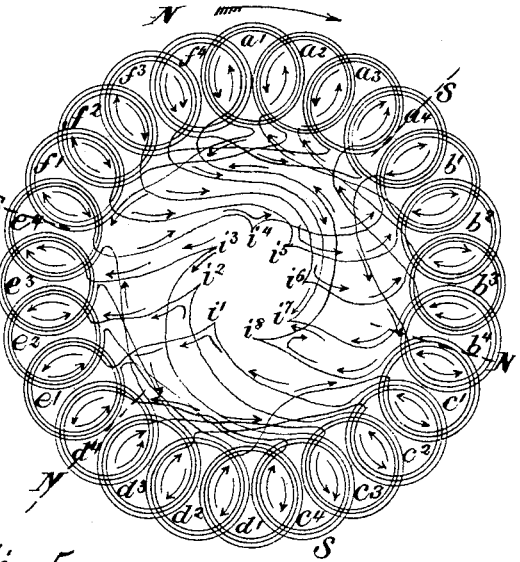
Figures 5, 6, 8, 9, 10:
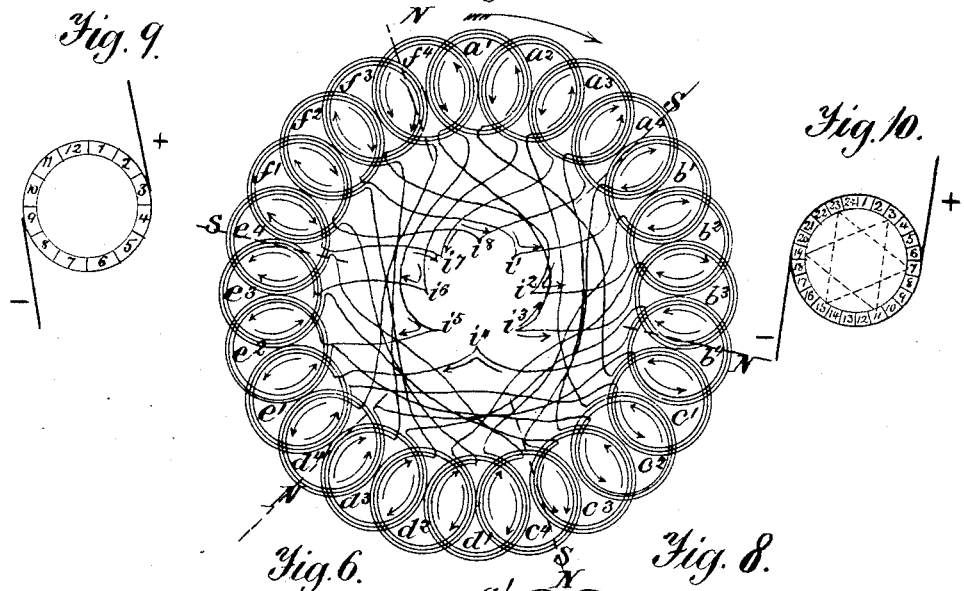

In the drawings, Figure 1 is a side view of the coils as arranged in an armature-wheel according to my invention. Fig. 2 is an edge view thereof. Fig. 3 is a diagram illustrating the manner of connecting the coils with the commutator, and connecting the several ranges or layers of coils together in a machine using two field-magnets. Figs. 4 and 5 are diagrams illustrating the connections for a machine having six field-magnets. Fig. 6 is a diagram illustrating a single coil. Fig. 7 is a side view of an armature of modified construction; and Fig. 8 is a similar view of another armature, having coils of somewhat different shape from those shown in Fig. 1. Fig. 9 is a diagram of a commutator and brushes such as used with a bipolar machine provided with an armature constructed according to my invention, and illustrated in Figs. 1 and 2. Fig. 10 is a diagram of a commutator and brushes for use in a multipolar machine provided with an armature constructed according to my invention, and illustrated in Figs. 4, 5, and 6.

The several coils are intended to be wound in plane of rotation and supported in any well-known manner, as heretofore practiced; and with this understanding I will not here give any more particular description of the separate coils, but will proceed to describe the manner of arranging the coils and connecting the same one to another and from layer to layer. By the term "layer" I mean all the coils which are in a common plane perpendicular to the axis of rotation, and for convenience of description the layers are designated as "first," "second," "third," and "fourth." It will be understood, however, that there may be only three layers, or any desired number more than four. The mode of connecting will vary slightly, according to the number of field-magnets employed, but will be carried out on the general principle of connecting the entire number of coils in one closed circuit, so that each coil will give off its due proportion of current.

Referring to Fig. 1, the letter A designates the armature, and the letters *a b c*, accompanied by numerals, designate the coils, those coils designated by letters having the exponent 1 forming the first layer, those having 2 as an exponent the second layer, and so on. The armature shown in Fig. 1 is designed to be used in a machine employing two field-magnets with opposite poles facing each other. Each helix in a layer occupies one hundred and twenty degrees of the circle. The helices of each layer lap those of adjacent layers about ninety degrees. If there should be a different number of layers, the degree of lapping would be correspondingly changed, so that the entire number of laps would in any case equal a complete circle.

It will be understood that the culminating points, or points of maximum effect, where the axis of the coils correspond with the axis of the field-magnet's poles, will be reached successively in the respective layers; and hence with four layers and three coils in each layer, as shown in Fig. 1, there will be twelve axes or centers for the coils, and this number multiplied by the number of field-magnets used will give the number of maximum points reached in each complete rotation of the armature.

In the several illustrations of the armature the positions of the field-magnet poles are indicated at N and S, respectively. In Fig. 3 six coils, $a'$ $a^2$ and $a^3$ $c^4$ $c^3$ $c^2$, are giving a current in one direction and the other six in the other direction. There is a consequent positive pole at the commutator-plate between $a^3$ and $a^4$ and a consequent negative pole between $c'$ and $c^2$. This will continue for thirty degrees of rotation, when the next commutator-plate comes under the brush, and the consequent electrical poles are between $a^4$ and $b'$ and $c^2$ and $c^3$, and continue so for another thirty degrees of rotation. In Fig. 4 the consequent positive pole is at $i^7$ and consequent negative pole at $i^3$. After fifteen degrees of rotation they will be at $i^8$ (+) and $i^4$ (—), and next at $i'$ (+) and $i^5$ (—), and so on. The source of the current in Fig. 5 will now be fully understood, by the assistance of the arrows, without further explanation.

The arrows indicate the direction of the current for one position of the armature, the direction being reversed simultaneously in all the coils each time the radial limbs of the coils pass a pole of the field-magnets.

In the diagram Fig. 3 the outer end of helix $a'$ is connected to the inner end of the helix $a^2$. In the next layer the outer end of helix $a^2$ is connected to the inner end of helix $a^3$, and so on to helix $a^4$, the outer end of which is connected back to the inner end of helix $b'$ in the first layer, and then the coils $b^2$ $b^3$ $b^4$ are connected in series and back to the succeeding helix of the first layer, this connection being continued in the same manner until all the helices having similar letters are connected in series transversely across the wheel, and all the layers are also serially connected in a closed circuit, as shown. There are twelve commutator-plates, and a connection is taken off, as shown at $k$, between each two helices in a transverse row to successive commutator-plates following a plate to which the inner end of each helix of the first layer and the connected outer end of another helix in the fourth layer are connected. This is the manner of connecting up the coils and layers thereof in a machine employing two field-magnets. It will be readily observed that a great advantage is gained by arranging the coils in lapping or progressive order, as I am thus enabled to use a large number of wide coils, the number used being limited only by considerations of practical convenience. If the coils were all in one layer, as in previously constructed machines, they would necessarily be so narrow or the limbs so close together that they would have very little effect, as the quantity of electricity generated by each coil is commensurate with the area of magnetic field which the coil surrounds. If there were only a single layer and the coils wide, there would necessarily be so few coils in a circle and their limbs so widely separated, and coming under the influence of the poles at such wide intervals, that a pulsatory and unsteady current would be generated instead of the practically-continuous current which is generated by my wide and lapping coils, the limbs of which in the adjacent layers follow each other toward and from the magnet-poles in such close succession. It will be manifest that advantage of the same character attends a machine having more than two field-magnets.

In Fig. 7 I have shown an armature having six coils in each layer and each coil occupying, practically, sixty degrees of the circle. The lap of the coils of each layer upon those of adjacent layers will be governed by the number of layers, so that all the laps will be equal and the intervals uniform between the limbs of the helices in each layer and those of adjacent layers.

In Fig. 4 is illustrated a manner of connecting up, which is especially adapted to a machine in which the poles of the field-magnets alternate in name and are the same in number as the armature-coils in one layer—that is, six in the present instance. In this mode of connecting, the coils are connected to the commutator-plates in groups comprising half-circles. The helix $A'$ has its inner end connected on one side to the inner end of the helix $b'$ and its outer end on the outer side to the outer end of helix $f'$. All the helices having numbered letters $a$ in the several layers are connected to helices lettered $b'$ $b^2$ $b^3$ $b^4$ and $f'$ $f^2$ $f^3$ $f^4$ in a similar manner, and the outer ends of the helices lettered $b^2$ $b^3$ $b^4$ are respectively provided with commutator-connections, as indicated at $i^5$ $i^6$ $i^7$, in common with the inner ends of the helices $f'$ $f^2$ $f^3$. Thus is formed one of the semicircular groups of which the helices $a'$ $a^2$ $a^3$ $a^4$ are the central helices, and the other helices are similarly grouped, with the helices $d'$ $d^2$ $d^3$ $d^4$ as the center helices. Now, to connect these two semicircular groups in a closed circuit, the outer end of helix $b'$ has a commutator-connection, $i^4$, in common with the inner end of helix $e^4$ of the opposite group, and the outer end of helix $c'$ in said opposite group has a commutator-connection, $i^8$, in common with the inner end of helix $f^4$ of the first group.

It will be understood that, if desired, the helices shown as connected in series to each commutator-connection might be connected thereto in multiple arc or separately. Thus in Fig. 4 helices $f'$, $a'$, and $b'$ would each be connected separately to connections $i^4$ and $i^5$, respectively. Twenty-four commutator-plates will be used, and the connections thereto are made as follows, commencing with the connection $i'$, which will be connected with plates 1, 9, and 17. Connection $i^2$ will lead to plates 2, 10, and 18, and so on in regular order, each connection leading to three commutator-plates separated by the indicated intervals. It will now be understood that the current generated in each three serially-connected helices goes in one direction to three commutator-plates and in the opposite direction to three other commutator-plates of opposite character or position.

In the diagram Fig. 5 the helices are represented as connected alternately—that is to say, the helices $a'$, $c'$, and $e'$ are connected in series, the inner end to outer, the inner end left free having at one end of the series a commutator-connection in common with the outer end of series composed of helices $b^4 d^4 f^4$, the inner end of which has in turn a common commutator-connection with the outer end of the series including helices $b^3 d^3 f^3$, the inner end of which has a common commutator-connection with the outer end of series including $b^2$, $d^2$, and $f^2$, and so on throughout the entire number of helices. This manner of connecting, like the preceding, is especially adapted for use with a number of field-magnets equal to the number of helices in a layer, and having their poles alternated—that is, each pole of a given sign being arranged between two poles of the opposite sign. The commutator-connections are connected with the commutator-plates in the same order as in the previously-described connections of a multipolar machine. In both forms there are three positive (+) and three negative (—) points on the commutator, though only one pair of brushes need be used, thus giving the advantage of a machine with several pairs of field-magnets, which is as easily managed as one with only one pair, the duplication of the pairs of brushes being found very objectionable in practice, and requiring a great deal of care to keep them in proper relative adjustment.

In the modification shown in Fig. 7, I use six helices in each layer; but the manner of connecting up will be governed by the essential principle already set forth.

In the modification shown in Fig. 8 the helices are given a triangular shape, this form giving the helices radial limbs, so that large portions of the coils come under the influence of the magnets at the same time. The connections, however, will be substantially the same in the several modifications.

Having now fully described my invention and explained the manner of using the same, I claim—

1. An armature-wheel comprising three or more layers of helices, each of which is wound in the plane of rotation, the helices of each layer lapping those of adjacent layers, and the entire number of helices being connected in a closed circuit provided with suitable commutator-connections, substantially as described.

2. An armature-wheel composed of three or more layers of coreless helices wound in the plane of rotation, the helices of each layer lapping those of adjacent layers in such manner as to divide the circle of the wheel into equal spaces between the limbs of successive helices in adjacent layers, substantially as described.

3. An armature-wheel composed of three or more layers of helices coiled in the plane of rotation and arranged in lapping order, as described, the helices of each layer being divided into groups, each group having a common direct commutator, and the whole number of helices being connected in closed circuit, substantially as described.

4. An armature-wheel composed of three or more layers of helices wound in the plane of rotation and arranged in lapping order, as set forth, the helices of each group being connected serially to common commutator-connections, substantially as described.

In testimony whereof I affix my signature in presence of two witnesses.

TOWNSEND WOLCOTT.

Witnesses:
 H. H. WOLCOTT,
 GEO. H. MYERS.